(12) United States Patent
Itakura et al.

(10) Patent No.: US 12,617,087 B2
(45) Date of Patent: May 5, 2026

(54) TRANSFER APPARATUS

(71) Applicant: ELEVEN INTERNATIONAL CO., LTD., Osaka (JP)

(72) Inventors: Tsuyoshi Itakura, Osaka (JP); Shigenori Murakami, Hyogo (JP)

(73) Assignee: ELEVEN INTERNATIONAL CO., LTD., Osaka (JP)

( * ) Notice: Subject to any disclaimer, the term of this patent is extended or adjusted under 35 U.S.C. 154(b) by 121 days.

(21) Appl. No.: 18/740,094

(22) Filed: Jun. 11, 2024

(65) Prior Publication Data

US 2024/0326246 A1 Oct. 3, 2024

Related U.S. Application Data

(63) Continuation of application No. PCT/JP2022/035465, filed on Sep. 22, 2022.

(30) Foreign Application Priority Data

Dec. 20, 2021 (JP) ................................ 2021-205740
May 28, 2022 (JP) ................................ 2022-087284

(51) Int. Cl.
 B25J 9/00 (2006.01)
 B25J 9/16 (2006.01)
 (Continued)

(52) U.S. Cl.
 CPC ........... B25J 9/1661 (2013.01); B25J 9/0096 (2013.01); B41J 3/4078 (2013.01); B41J 11/06 (2013.01);
 (Continued)

(58) Field of Classification Search
 CPC ........ B25J 9/1661; B25J 9/0096; B25J 15/00; B25J 15/06; B41J 3/4078; B41J 11/06;
 (Continued)

(56) References Cited

U.S. PATENT DOCUMENTS 3,772,948 A * 11/1973 Burton ................... A41H 42/00
 83/155.1
5,230,764 A 7/1993 Moll
 (Continued)

FOREIGN PATENT DOCUMENTS

CN 110820181 A 2/2020
EP 0380579 B1 9/1993
 (Continued)

OTHER PUBLICATIONS

Kato et al. (JPH0781829.translate), Cut-Cloth Sorting System. Toray Industries; Toyama Goorudouin. (Year: 1995).*
 (Continued)

*Primary Examiner* — B M M Hannan
(74) *Attorney, Agent, or Firm* — Nakanishi IP Associates, LLC

(57) ABSTRACT

A transfer apparatus picks up and transfers plurality of parts, placed on one same plane as a result of a sheet being cut in a cutting step, to a next step. The transfer apparatus includes a plurality of pickup arms each including an extendable arm portion and an adsorption hand adsorbing each of the plurality of parts at a tip of the arm portion. The plurality of pickup arms are movable between the cutting step and the next step. The transfer apparatus further includes controller driving and controlling the plurality of pickup arms. The controller causes relative positions, as seen in a plan view, of the adsorption hands to be changed based on graphics data used in the cutting step, and causes each of the plurality of parts to be adsorbed and picked up by at least one of the adsorption hands.

4 Claims, 14 Drawing Sheets

(51) Int. Cl.

| | |
|---|---|
| *B41J 3/407* | (2006.01) |
| *B41J 11/06* | (2006.01) |
| *B41J 11/14* | (2006.01) |
| *B41J 11/66* | (2006.01) |
| *B41J 13/00* | (2006.01) |
| *B25J 15/00* | (2006.01) |

(52) U.S. Cl.

CPC ............... *B41J 11/14* (2013.01); *B41J 11/66* (2013.01); *B41J 13/0027* (2013.01); *B25J 15/00* (2013.01)

(58) Field of Classification Search

CPC ........ B41J 11/14; B41J 11/66; B41J 13/0027; A41H 42/00; A41H 43/0235; D05B 33/00

USPC ........................................................ 700/245

See application file for complete search history.

(56) References Cited

U.S. PATENT DOCUMENTS

| | | | |
|---|---|---|---|
| 5,889,675 A | 3/1999 | Minami et al. | |
| 11,254,154 B1 * | 2/2022 | Thammasouk | .......... B41J 11/20 |
| 2007/0199466 A1 | 8/2007 | Franz | |
| 2011/0203506 A1 | 8/2011 | Price et al. | |

FOREIGN PATENT DOCUMENTS

| | | |
|---|---|---|
| JP | S62-102796 A | 5/1987 |
| JP | H3-220363 A | 9/1991 |
| JP | H7-81829 A | 3/1995 |
| JP | H9-30649 A | 2/1997 |
| JP | 2005-040160 A | 2/2005 |
| JP | 2005-111596 A | 4/2005 |
| JP | 2006-204368 A | 8/2006 |
| JP | 2021-48926 A | 4/2021 |

OTHER PUBLICATIONS

Minami et al. (JPH0930649.translate), Pickup Device. Mitsubishi Electric Corp (Year: 1997).*

Kobayashi (JP2005111596.translate), Device for Stacking Object To Be Cut. Atelier Sooken. (Year: 2005).*

Matsushita Koichiro (JP2021080092.translate), Printing Device, Printing System, Controlling Method of Printingdevice, and Controlling Program. Konica Minolta Inc. (Year: 2021).*

Office Action issued in Brazilian Patent Application No. 112024010896-1 dated Sep. 17, 2025, with English Translation (10 pages).

Office Action issued in Russian Patent Application No. 2024117503 dated Apr. 11, 2025, with English Translation (10 pages).

Office Action issued in Russian Patent Application No. 2024117503 dated Jan. 16, 2025 with translation. (11 pages).

Extended European Search Report issued in European Patent Application No. 22910495.5, dated Feb. 24, 2025 (9 pages).

International Search Report issued in PCT/JP2022/035465 mailed on Dec. 6, 2022 with English Translation (5 pages).

Written Opinion of International Searching Authority issued in PCT/JP2022/035465 mailed on Dec. 6, 2022 with English Translation (7 pages).

Notification of Reasons for Refusal issued in Taiwanese Patent Application No. 111147647 dated Nov. 1, 2023 with English Translation (11 pages).

Office Action issued in Chinese Patent Application No. 202280080993.0 dated Jan. 28, 2026, with English Translation (19 pages).

Office Action issued in Canadian Patent Application No. 3240637 dated Jan. 28, 2026. (3 pages).

* cited by examiner

TRANSFER APPARATUS

TECHNICAL FIELD

The present invention relates to a transfer apparatus transferring a plurality of parts, placed on one same plane as a result of a sheet being cut, to a next step.

FIELD OF INVENTION

Conventionally, a work of picking up parts that have been cut from a sheet or the like by a cutting device and are to be, for example, sewn into an item, and transferring the parts to the next step is mainly performed manually.

A plurality of such parts are required to produce one product, and generally, the parts are not of one same shape but are of various shapes. Usually, it is devised that a sheet is cut into the parts with no waste, and therefore, the post-cutting parts are positionally arranged with no consideration of the next step. For this reason, the post-cutting parts are conventionally picked up in an orderly manner by a human operator visually based on, for example, the type of the parts or the sewing order.

However, once a pickup error occurs, the work of the next step and steps thereafter is disturbed, resulting in an inconvenience such that, for example, defective products are produced or the work is delayed.

Patent Document 1 (Japanese Laid-Open Patent Publication No. 2021-48926) discloses a transfer apparatus that picks up such post-cutting parts mechanically instead of manually, and transfers the parts to a template for sewing. This transfer apparatus includes a pickup device that includes pickup heads scattered on one same plane, and selectively picks up certain parts among a plurality of parts based on information specifying each of the parts.

CITATION LIST

Patent Literature

Patent Document 1: Japanese Laid-Open Patent Publication No. 2021-48926

SUMMARY

Technical Problem

The transfer apparatus described in, for example, Patent Document 1 that picks up the parts mechanically decreases the number of errors of picking up wrong parts as compared with the case where the parts are picked up manually.

However, the transfer apparatus has the following problems. The pickup heads are located at pre-defined positions, and some of the pickup heads are actuated to pick up the parts. Therefore, the transfer apparatus does not respond to a slight difference in shape among the parts and may not pick up desired parts. In addition, there are pickup heads that do not contribute to the pickup operation, and thus the work efficiency is not high.

In this situation, the present invention has a main object of providing a transfer apparatus that picks up parts of various shapes without fail to significantly decrease the number of pickup errors and transfers the parts efficiently.

Solution to Problem

The above-described object is achieved by a transfer apparatus picking up and transferring a plurality of parts, placed on one same plane as a result of a sheet being cut in a cutting step, to a next step. The transfer apparatus includes a plurality of pickup arms each including an extendable arm portion and an adsorption hand adsorbing each of the plurality of parts at a tip of the arm portion, the plurality of pickup arms being movable between the cutting step and the next step; and a controller driving and controlling the plurality of pickup arms, the controller causing relative positions, as seen in a plan view, of the adsorption hands to be changed based on graphics data used in the cutting step, and causing each of the plurality of parts to be adsorbed and picked up by at least one of the adsorption hands.

According to this structure, the plurality of parts, placed on one same plane as a result of a sheet being cut in the cutting step are picked up in a pre-defined order and transferred to the next step. This is realized as follows. Based on graphics data on the part to be picked up, the controller selects at least one pickup arm to be actuated in accordance with the size and the shape of the part. In the case where the part is not held properly by one pickup arm, for example, in the case where the part is large or has a complicated shape, plural pickup arms are cooperated. The arm portion of the selected pickup arm is driven to adsorb an appropriate site of the part with the adsorption hand to pick up the part. The part is transferred to the next transfer, and then is released. The pickup arms other than the pickup arm used to transfer one part are usable to pickup and transfer another part(s).

Advantageous Effects of Invention

As described above, according to the present invention, relative positions, as seen in a plan view, of the adsorption hands of the pickup arms are changed based on the graphics data, so that the plurality of parts are each held by one or the adsorption hands. Therefore, the parts of various shapes are picked up without fail. In addition, the pickup arms, among the plurality of pickup arms, that are not used to pick up one part are usable to pick up another part(s). Therefore, the parts are transferred efficiently.

DESCRIPTION OF EMBODIMENTS

Hereinafter, an embodiment of the present invention will be described with reference to the drawings.

Figure 1:
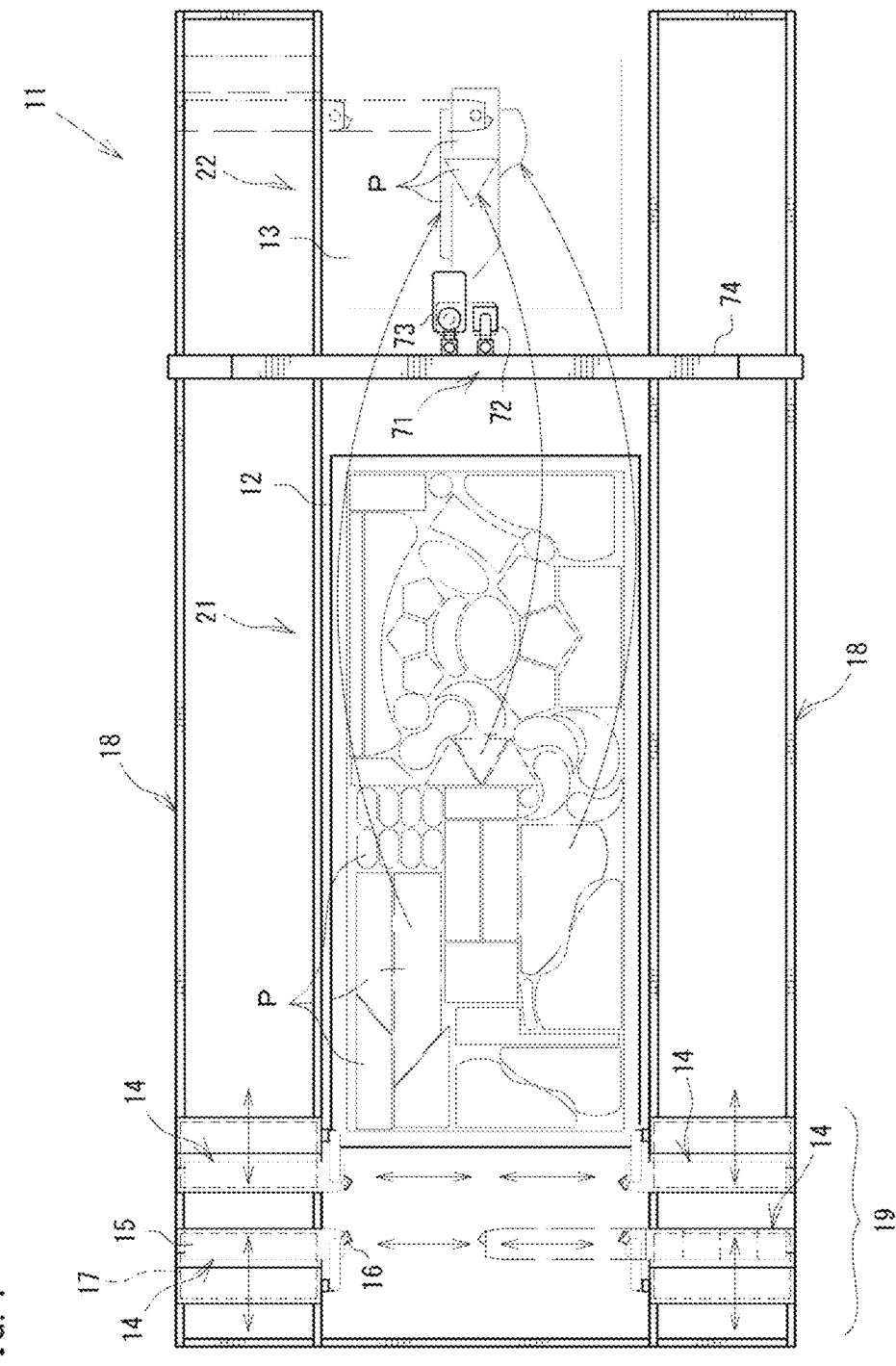
FIG. 1 is a plan view of a transfer apparatus according to an embodiment.

FIG. 1 is a plan view of a transfer apparatus 11. The transfer apparatus 11 picks up a plurality of parts P placed on one same plane as a result of a sheet being cut in a cutting step, and transfers the parts P to a next step.

In FIG. 1, the parts P are shown as being transferred from left to right, namely, in a transfer direction. On a first-stage table 12, the post-cutting parts P are placed. A second-stage table 13 is located to the right of the first-stage table 12. On the second-stage table 13, the parts P that have been picked up are stacked in a predetermined order.

The parts P to be picked up by the transfer apparatus 11 may be in a state of being cut by a cutting device, or may be in a state of being moved after being cut with a positional arrangement thereof not being changed. In the example shown in FIG. 1, the first-stage table 12 includes a cutting device (not shown). The cutting device cuts the sheet based on graphics data input thereto. In this example, a portion including the first-stage table 12 is referred to as a cutting step portion 21.

On the second-stage table 13, the necessary parts P are gathered before a bonding step of bonding the parts P. A portion including the second-stage table 13 is referred to as a gathering step portion 22. The step performed by the gathering step portion 22 is the "next step" mentioned above. In the gathering step portion 22, the parts P may be stacked in an orderly manner on the second-stage table 13, may be accommodated in an appropriate box, or may be arranged such that the parts P have a predetermined positional relationship. The bonding step may be performed in this next step.

Specifically, the transfer apparatus 11 is used to produce various sewn products such as a sheet cover and an air bag of an automobile, clothing and the like. The transfer apparatus 11 is preferred to pick up necessary parts P, among parts P obtained as a result of cutting, in an orderly manner with no human error and to transfer the necessary parts P to a sewing step.

The transfer apparatus 11 includes a plurality of pickup arms 14. The pickup arms 14 each include an extendable arm portion 15 and an adsorption hand 16 adsorbing a part P at a tip of the arm portion 15.

The pickup arms 14 are movable between the first stage and the second stage (next step), namely, between the cutting step portion 21 and the gathering step portion 22. The pickup arms 14 may be moved by any structure, for example, by a circling structure, as long as being moved from the first stage to the second stage, or from the second stage to the first stage. In the example shown in FIG. 1, the pickup arms 14 are movable by movable bodies 17, which move in a reciprocating manner between the cutting step portion 21 and the gathering step portion 22, more specifically, from a region of the cutting step portion 21 to a region of the gathering step portion 22 and from the region of the gathering step portion 22 to the region of the cutting step portion 21.

Plural pickup arms 14, more specifically, two pickup arms 14, are provided on each of two sides of a transfer line connecting the cutting step portion 21 and the gathering step portion 22. The pickup arms 14 are each supported by one movable body 17. Namely, the pickup arms 14 are each movable along the transfer line independently by the corresponding movable body 17.

Rails 18 are provided on each of the two sides of the transfer line, on which the cutting step portion 21 and the gathering step portion 22 are provided. The rails 18 are each longer than a total length of the cutting step portion 21, the gathering step portion 22, and the space therebetween. The rails 18 each include a wait portion 19 at a position upstream to the first-stage table 12 in the transfer direction. The movable bodies 17 and the pickup arms 14 wait in the wait portions 19. Herein, a direction in which the rails 18 extend is defined as an "X-axis direction", and a direction perpendicular to the X-axis direction is defined as a "Y-axis direction".

Figure 2:
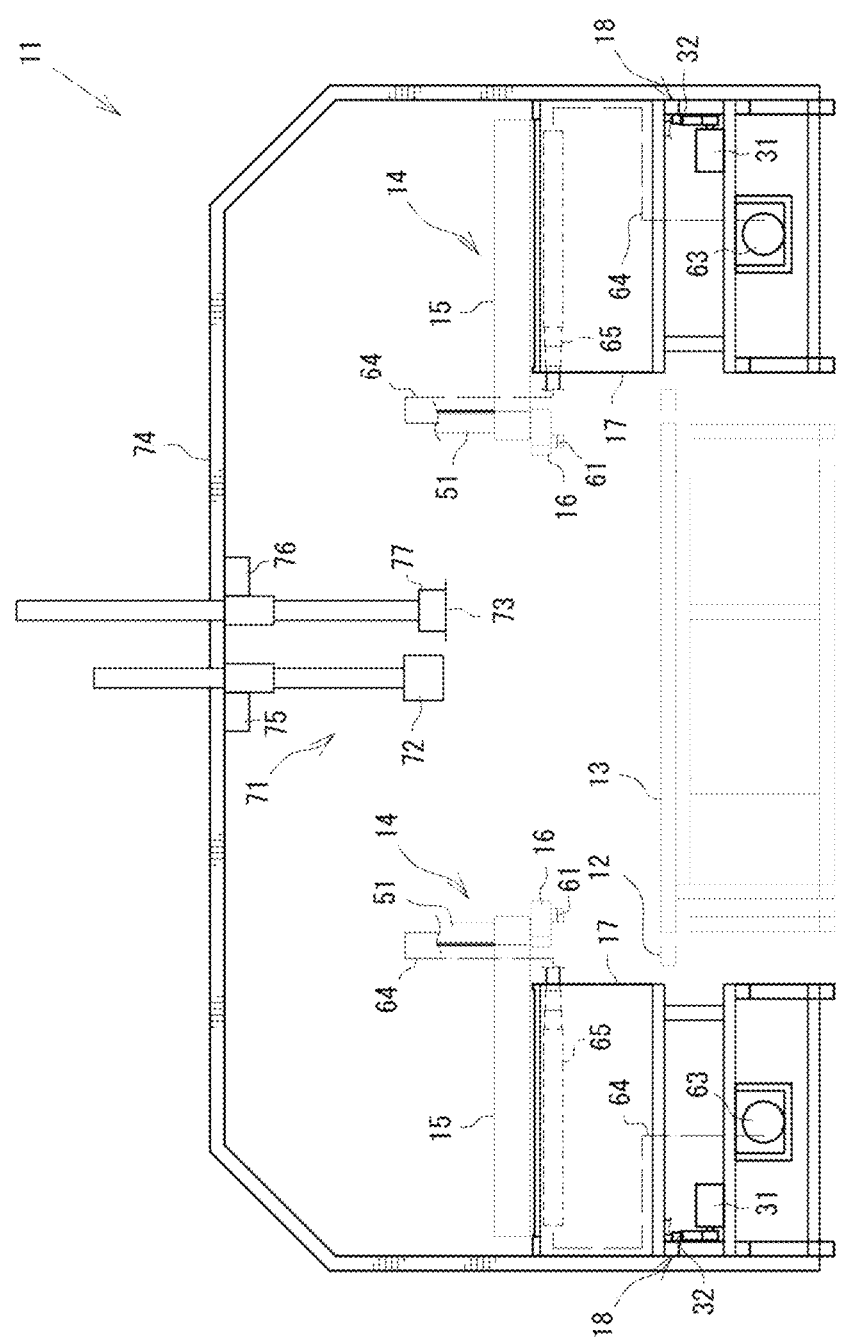
FIG. 2 is a view of the transfer apparatus as seen from the second-stage table side.
Figures 3A, 3B:
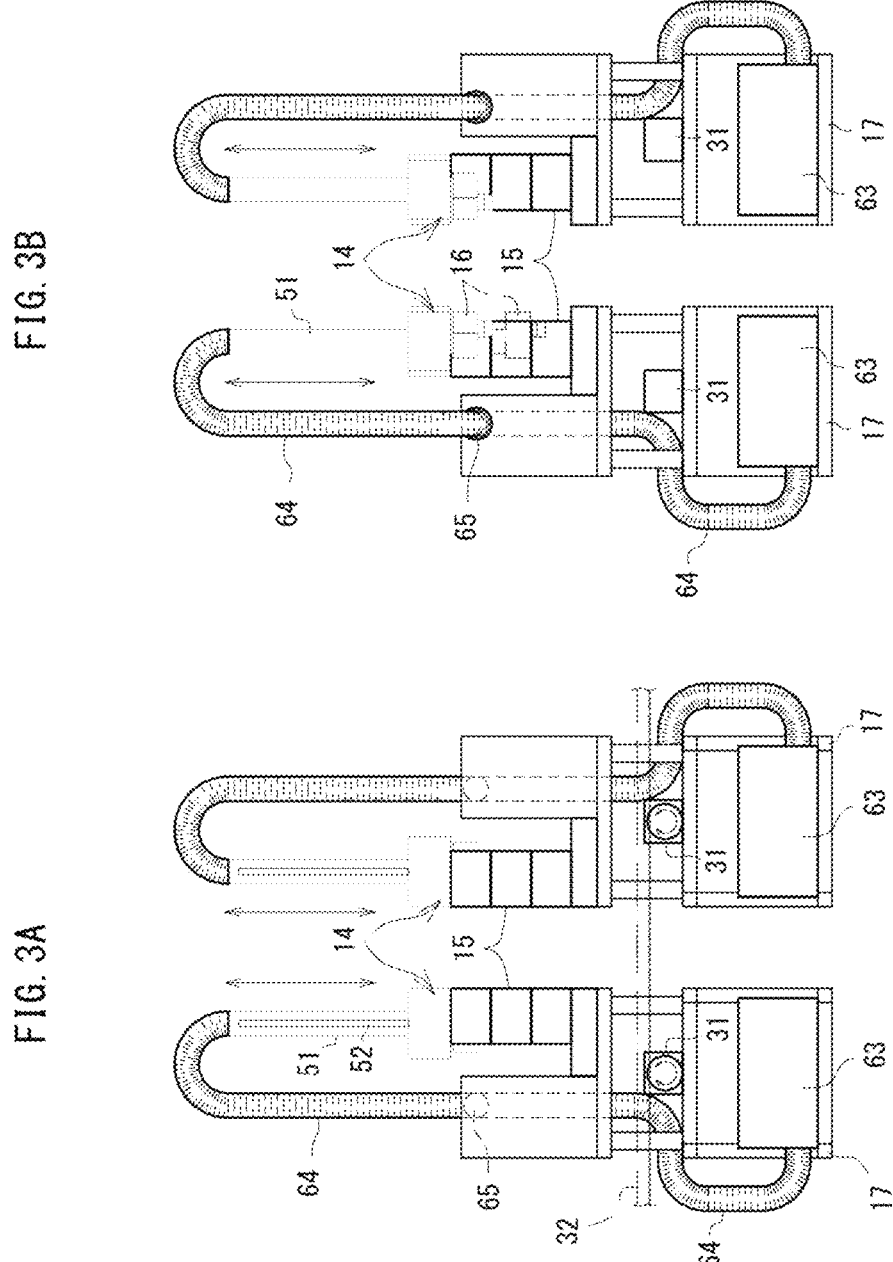
FIG. 3A is a rear view of a movable body and a pickup arm.
FIG. 3B is a front view of the movable body and the pickup arm.

FIG. 2 shows the transfer apparatus 11 as seen from the downstream side in the transfer direction, namely, from the second-stage table 13 side. As shown in FIG. 2, the movable bodies 17 are movably supported by the rails 18. The movable bodies 17 each include a moving motor 31, which is, for example, a servo motor, a stepping motor or the like. Referring to FIG. 3A, the moving motor 31 is in engagement with a rack 32 (shown with the phantom line) included in the rail 18 so as to be movable to, or stoppable at, a desired position on the rail 18.

FIG. 3A is a rear view of two movable bodies 17 and two pickup arms 14, namely, a view thereof as seen from an outer end in the Y-axis direction. FIG. 3B is a front view of the two movable bodies 17 and the two pickup arms 14, namely, a view thereof as seen in the opposite direction, i.e., from an inner end in the Y-axis direction.

As described above, the movable bodies 17 and the pickup arms 14 are provided on both of the two sides of the transfer line. Therefore, the arm portion 15 of each pickup arm 14 does not need to have a plurality of rotation axes and merely needs to be extendable linearly. The arm portion 15 has a structure shown in FIG. 4 and FIG. 5 so as to have a long stroke while occupying a small area when being retracted.

Figure 4:
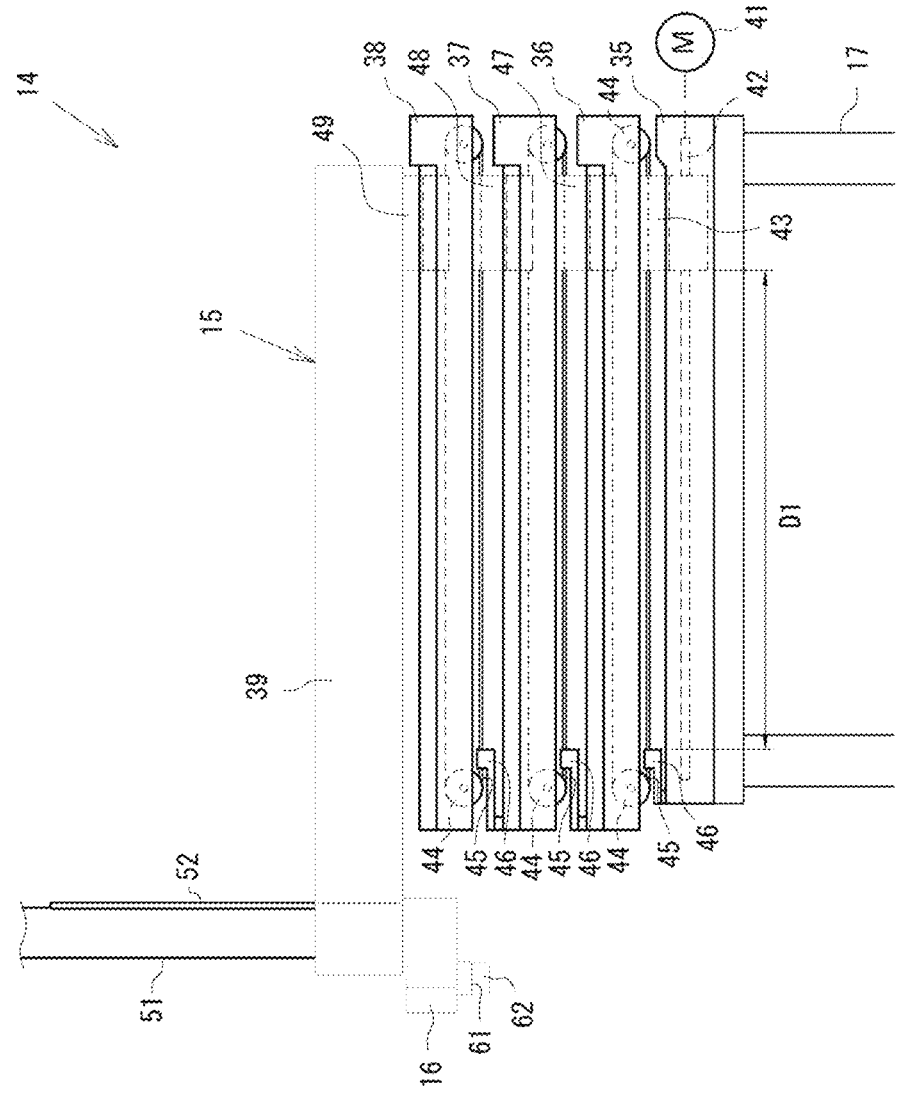
FIG. 4 is a view of the pickup arm in a retracted state as seen in an X-axis direction.
Figure 5:
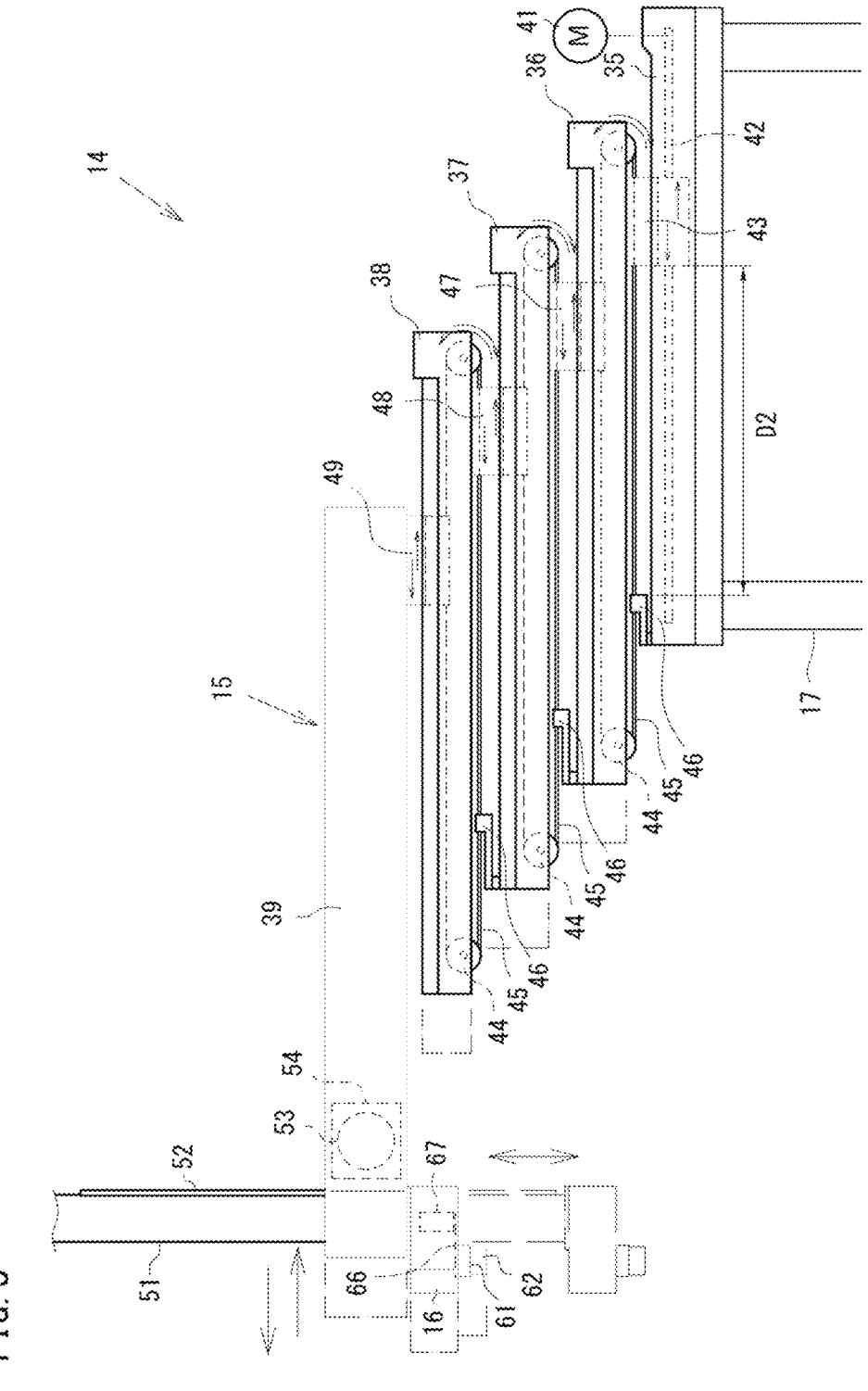
FIG. 5 is a view of the pickup arm in a slightly extended state as seen in the X-axis direction.

FIG. 4 is a schematic view showing a structure of the arm portion 15 in a retracted state as seen in the X-axis direction. FIG. 5 is a schematic view showing a structure of the arm portion 15 when being slightly extended as seen in the X-axis direction.

As shown in FIG. 4 and FIG. 5, the arm portion 15 includes a base portion 35, a plurality of movable arms 36, 37 and 38, and a top arm 39 located at an uppermost position. The plurality of movable arms 36, 37 and 38 are stacked on the base portion 35, and are movable with respect to each other. The base portion 35, the movable arms 36, 37 and 38, and the top arm 39 are each lengthy parallelepiped box-shaped.

In a retracted state of the arm portion 15, the elements of the arm portion 15 are located as follows. The plurality of movable arms 36, 37 and 38 are stacked on the base portion 35 in an up-down direction with rear ends thereof being aligned. On the movable arm 38, which is located at the uppermost position of the three movable arms 36, 37 and 38, the top arm 39 is located as protruding forward (inward) from the movable arm 38. In the example shown in FIG. 4 and FIG. 5, there are three movable arms 36, 37 and 38. The movable arm 36 at the lowermost position, the movable arm 37 at the middle position, and the movable arm 38 at the uppermost position among the three movable arms will be respectively referred to as the "first-stage movable arm 36", the "second-stage movable arm 37," and the "third-stage movable arm 38".

The base portion 35 has a ball spline 42 drivable by a motor (extension motor 41) built therein. The rear end of a bottom surface of the first-stage movable arm 36 is coupled with a movable head (first-stage movable head 43). The first-stage movable head 43 is relatively movable on the base portion 35, and the first-stage movable arm 36 and the first-stage movable head 43 are immovable with respect to each other.

All the movable arms 36, 37 and 38 are each provided with a belt 45, which is wound along a pair of pulleys 44 (front pulley and rear pulley) and extends in a front-rear direction (Y-axis direction). Below the first-stage movable arm 36, a portion of a bottom portion of the belt 45 that is in the vicinity of the front pulley 44 is secured to a coupling bracket 46 provided at an front end of the base portion 35. The bottom portion of the belt 45 does not interfere with the movable head (first-stage movable head 43) and is relatively movable with respect to the first-stage movable head 43.

The second-stage movable arm 37 and the third-stage movable arm 38 located on the first-stage movable arm 35 are each provided with a belt 45 wound along pulleys 44, like the first-stage movable arm 35. The belts 45 are secured to coupling brackets 46 provided at front ends of the movable arms 36 and 37, respectively. The belts 45 are secured to the coupling brackets 46 in the same manner as in the case of the first-stage movable arm 36 and the base portion 35.

The rear ends of bottom surfaces of the second-stage movable arm 37 and the third-stage movable arm 38 are respectively coupled with movable heads (second-stage movable head 47 and third-stage movable head 48), which are relatively movable on the first-stage movable arm 36 and the second-stage movable arm 37 respectively. The second-stage movable head 47 is secured to a top portion of the belt 45 provided in the first-stage movable arm 36, and the third-stage movable head 48 is secured to a top portion of the belt 45 provided in the second-stage movable arm 37. A rear end of a bottom surface of the top arm 39 is coupled with a fourth-stage movable head 49, which is secured to a top portion of the belt 45 provided in the third-stage movable arm 38.

This structure operates as follows. When the extension motor 41 is driven, the first-stage movable arm 36 moves forward by the first-stage movable head 43, and distance D1 between the first-stage movable head 43 and the coupling bracket 46 is shortened to distance D2 shown in FIG. 5. As a result, the belt 45 is rotated and the top portion of the belt 45 is pushed forward. Accordingly, the second-stage movable head 47, the third-stage movable head 48 and the fourth-stage movable head 49 move forward at the same time so as to protrude by the same distance with respect to the heads immediately below the respective heads, and the arm portion 15 extends as a whole.

The arm portion 15 is retracted in the opposite manner. When the extension motor 41 is driven, the first-stage movable head 43 is retracted to move the first-stage movable arm 36 rearward. Then, the belts 45 in the movable arms 36, 37 and 38 rotate in the opposite direction. As a result, the movable arms 36, 37 and 38 and the top arm 39 are retracted to the original positions thereof. The arm portion 15 is shortened as a whole.

A front tip of the arm portion 15 is movable in a region from an end in the Y-axis direction of the first-stage table 12 and the second-stage table 13 to a center in the Y-axis direction of the first-stage table 12 and the second-stage table 13.

The adsorption hand 16 is provided at a front tip of the top arm 39 of the arm portion 15. The adsorption hand 16 is hollow and parallelepiped box-shaped. As shown in FIG. 3B and FIG. 5, the adsorption hand 16 is elevatable with respect to the top arm 39. Namely, the adsorption hand 16 is provided at a bottom end of an elevation pipe 51 running through a front tip portion of the arm portion 15 in the up-down direction. The elevation pipe 51 is hollow. As shown in FIG. 5, the elevation pipe 51 is provided with a rack 52 provided on a circumferential surface thereof and extending in a longitudinal direction. A pinion 53 in engagement with the rack 52 and an elevation motor 54 rotating the pinion 53 are provided in the top arm 39. The elevation motor 54 is a servo motor, a stepping motor or the like.

At a tip of a bottom surface of the adsorption hand 16, a cylindrical adsorption opening 61 is formed. The adsorption opening 61 has a size suitable to adsorb a part P. An inner cylinder 62 is provided inside the adsorption opening 61. The inner cylinder 62 is projectable from, and retractable into, the adsorption opening 61. Although one adsorption opening 61 is formed in this example, two or more adsorption openings 61 may be formed. The shape, the size, the location and other manners of provision of the adsorption opening(s) 61 are defined in accordance with the part P.

Figure 6:
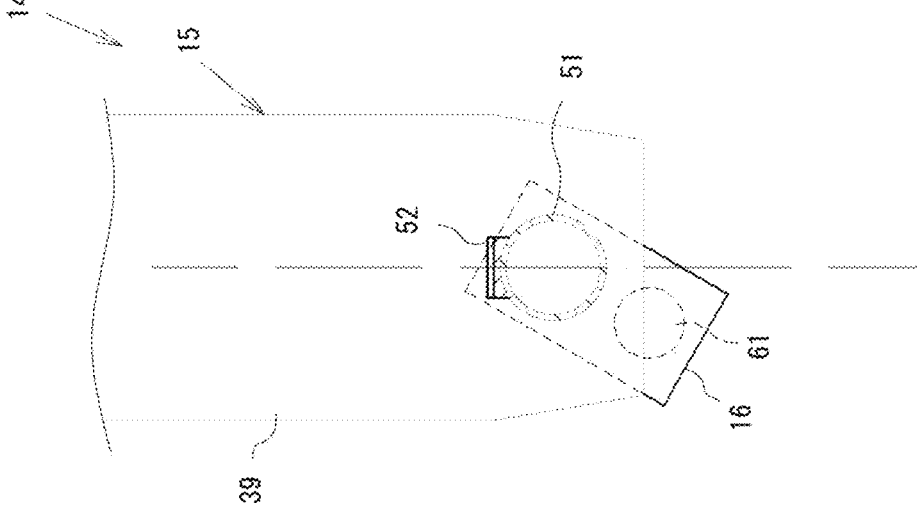
FIG. 6 is a plan view of tips of a pair of (left and right) the pickup arms.
Figure 6:
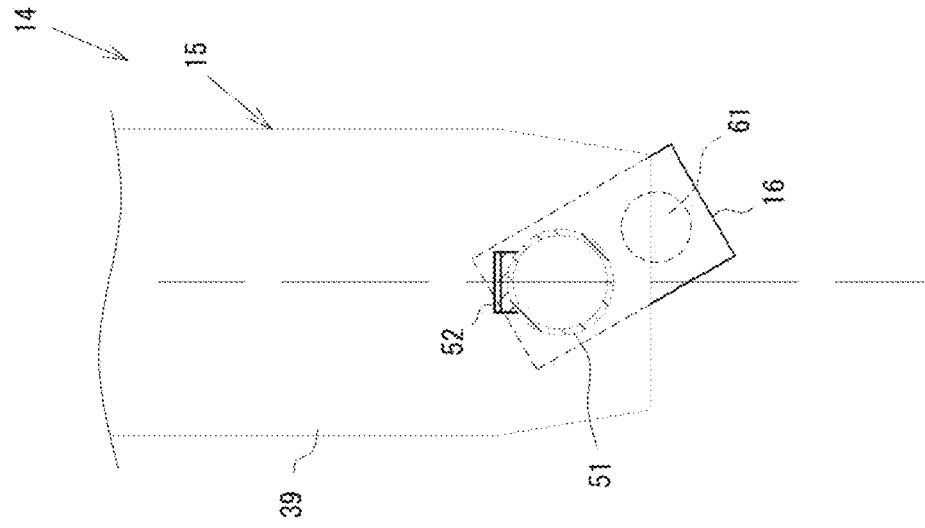

As shown in FIG. 6, the parallelepiped box-shaped adsorption hand 16 is provided obliquely with respect to the X-axis direction and the Y-axis direction as seen in a plan view. Specifically, a pair of (left and right) adsorption hands 16 provided side by side in the X-axis direction are inclined such that tips thereof are closer to each other than the rest thereof. The pair of adsorption hands 16 are located in this manner such that the adsorption openings 61 of a pair of (left and right) pickup arms 14 are close to each other. With such an arrangement, even a relatively small part P is adsorbed by a cooperation of the adsorption openings 61 of the left and right pickup arms 14 adjacent to each other.

As shown in FIG. 2, FIG. 3A and FIG. 3B, a pump 63 as a negative pressure source that causes the adsorption hand 16 to exert an adsorption force is mounted on the movable body 17. A pipe 64 extending from the pump 63 is connected with a top end of the elevation pipe 51 via an extendable pipe 65 (see FIG. 2), which is provided to the side of the adsorption hand 16.

The extendable pipe 65 has a telescopic structure, and extends and retracts in accordance with the extension and retraction of the arm portion 15.

The adsorption through the adsorption opening 61 is performed continuously while the pump 63 is driven. As shown in FIG. 5, an open/close shutter 66 opening or closing the adsorption opening 61 is provided in the adsorption hand 16 in order to stop the adsorption. The open/close shutter 66 is driven by an open/close shutter actuator 67, which is, for example, a solenoid.

The transfer apparatus 11 further includes a printing portion 71 (FIG. 1). More specifically, the printing portion 71 is provided between the cutting step and the next step, namely, between the cutting step portion 21 and the gathering step portion 22 and between the rails 18. The printing portion 71 performs printing on a part P held by the pickup arms 14. The printing portion 71 provides each part P with an identification mark. As shown in FIG. 1 and FIG. 2, the printing portion 71 includes a printer 72 and a support plate 73, which is provided when necessary.

The printer 72 is, for example, an inkjet printer. As shown in FIG. 2, the printer 72 is supported by a printer elevation motor 75 so as to be elevatable with respect to a support frame 74, which is provided over the rails 18. The support plate 73 is used in the case where the part P adsorbed and held by the adsorption hand 16 is loose and printing cannot be performed on the part P. The support plate 73 is adjacent to the printer 72, and is elevatable by a support plate elevation motor 76 toward the support frame 74. The support plate 73 is supported by a support actuator 77 so as to be horizontally rotatable. The support actuator 77 is, for example, a solenoid. The support plate 73 is selectively movable between a position below the part P and a position off the position below the part P.

Figure 7:
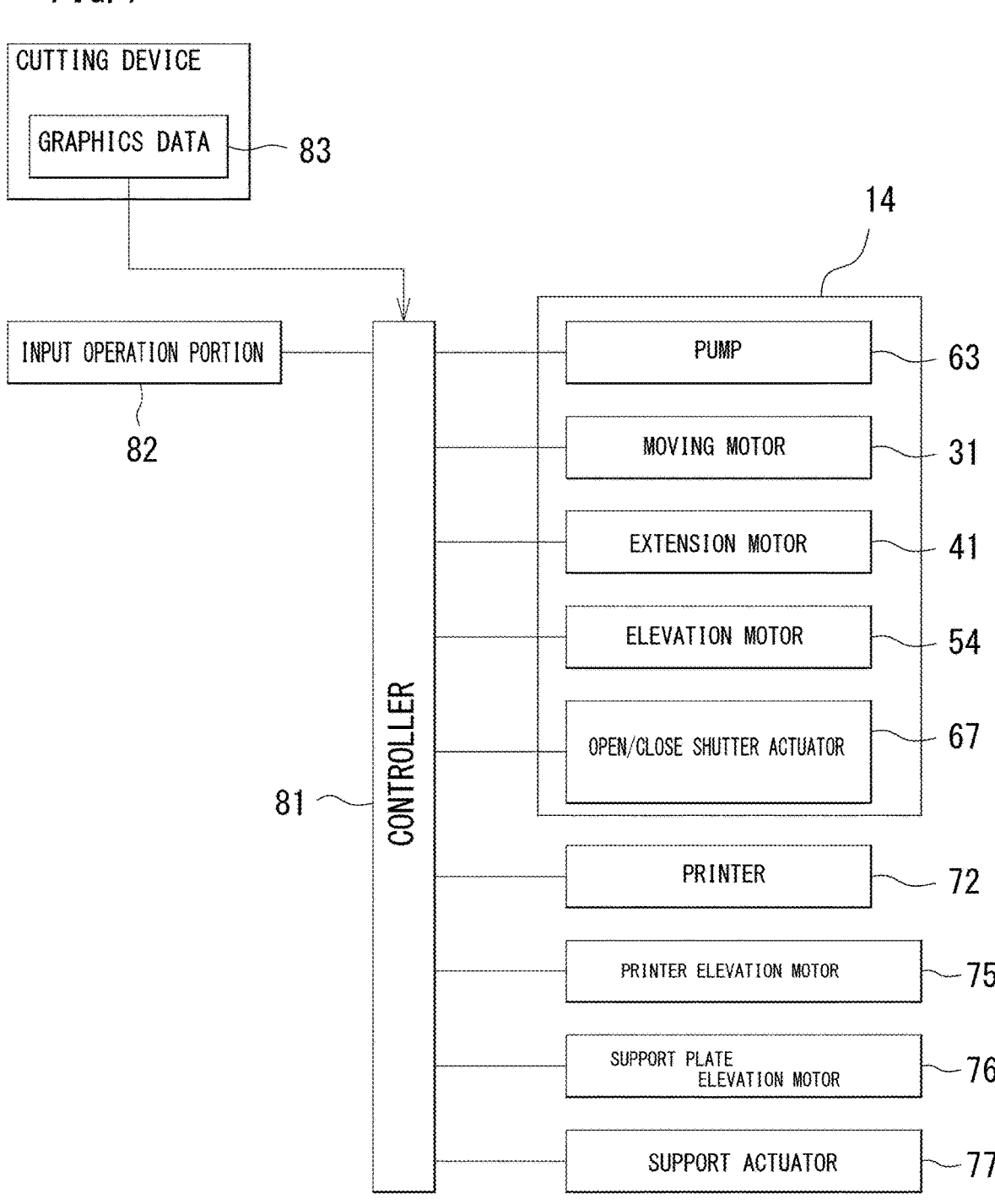
FIG. 7 is a block diagram of the transfer apparatus.

FIG. 7 is a block diagram showing the above-described structure of the transfer apparatus 11. A controller 81 includes a built-in ROM storing a program and a built-in RAM storing data necessary to operate the transfer apparatus 11. Graphics data 83 is input from the cutting device to the controller 81 in accordance with an input operation made on an input operation portion 82. The graphics data 83 includes position information (two-dimensional coordinate position information) and identification information. The controller 81 performs calculations based on the graphics data 83 to drive and control each of the elements of the transfer apparatus 11.

Hereinafter, the driving to control the elements performed by the controller 81 will be described.

First, the control of the controller 81 will be described roughly. Based on an operation made on the input operation portion 82, which is, for example, a personal computer, the controller 81 reads the graphics data 83 from the cutting device. Referring to the graphics data 83 and the identification information on the parts P, the controller 81 determines the parts P to be picked up and the order in which the parts P are to be picked up, based on a pre-stored program. At the same time, the controller 81 determines, by calculations, which site of each part P is to be adsorbed and which pickup arm 14 is to be used.

Before starting a transfer operation, the controller 81 drives the pumps 63. At this point, the open/close shutter actuators 67 are adjusted so as to open the open/close shutters 66.

Based on the determinations, the controller 81 drives the moving motor 31 of at least one movable body 17 including the selected pickup arm 14 among the plurality of pickup arms 14 in a wait state, and thus moves the movable body 17 to a position corresponding to the part P to be picked up and stops the movable body 17.

As described above, the direction in which the rails 18 extend is defined as the "X-axis direction", and a direction perpendicular to the X-axis direction is defined as the "Y-axis direction". The "position corresponding to the part P" mentioned above is the position in the X-axis direction. Precisely, such a position in the X-axis direction is determined in consideration of the site of the part P to be adsorbed.

Next, the controller 81 drives the extension motor 41 to move the adsorption hand 16 to a position above a predetermined adsorption site, in the Y-axis direction, of the part P and to stop the adsorption hand 16. In this state, the controller 81 drives the elevation motor 54 to lower the adsorption hand 16 to a predetermined position (see (A) in FIG. 8). Then, the part P is adsorbed to the adsorption opening 61 by the adsorption force (see (B) in FIG. 8). At the time of adsorption, the inner cylinder 62 inside the adsorption opening 61 is retracted to pull up the part P.

Figure 8:
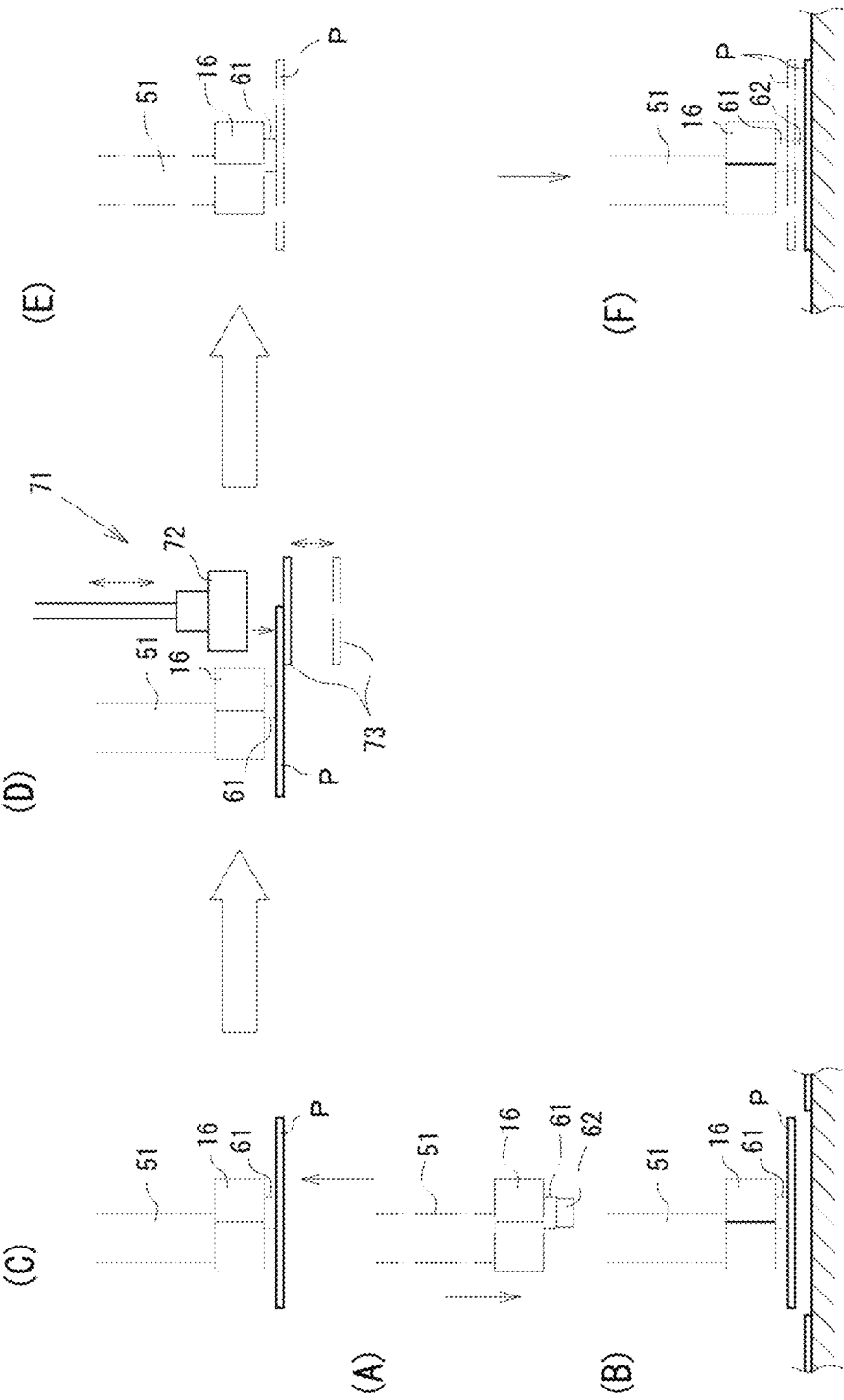
FIG. 8 shows a transfer operation.

After elevating the adsorption hand 16 up to a predetermined height, the controller 81 stops the elevation motor 54 (see (C) in FIG. 8). When necessary, the controller 81 drives the extension motor 41 to move the adsorption hand 16 in the Y-axis direction toward the center in the Y-axis direction. In this state, the controller 81 drives the moving motor 31 to move the pickup arm 14 in the X-axis direction toward the next step, namely, toward the second-stage table 13.

When the pickup arm 14 moving as described above reaches a position between the first-stage table 12 and the second-stage table 13, the controller 81 stops the moving motor 31 and causes printing to be performed (see (D) in FIG. 8). More specifically, the controller 81 drives the support plate elevation motor 76 to lower the support plate 73 to a position below a site of the part P on which the printing is to be performed, and then drives the support actuator 77 to locate the support plate 73 below the part P. Then, the controller 81 drives the support plate elevation motor 76 to elevate the support plate 73 up to a predetermined position such that the part P is supported in a state where the site on which the printing is to be performed is flat.

In this state, the controller 81 drives the printer elevation motor 75 to lower the printer 72 to a predetermined position and drives the printer 72. As a result of the printer 72 being driven, the printing is performed on the part P. After the printing, the controller 81 drives the printer elevation motor 75, the support plate elevation motor 76 and the support actuator 77 to return the printer 72 and the support plate 73 to initial positions thereof.

Figure 9:
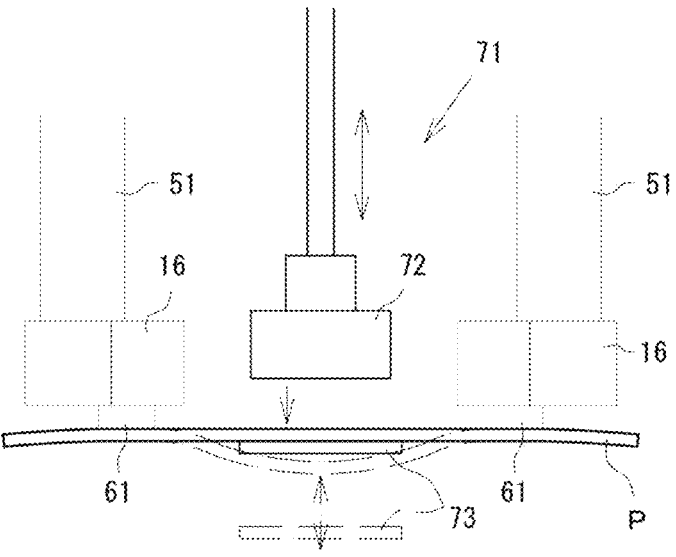
FIG. 9 shows a state where plural adsorption hands adsorb a part for printing.

Referring to FIG. 9, in the case where the part P is to be held by two or more pickup arms 14, the printing may be performed in a state where a portion of the part P that is not adsorbed is supported by, and between, the adsorption hands 16.

After the above-described operation, the controller 81 drives the moving motor 31 again to move the part P to a predetermined position above the second-stage table 13 (see (E) in FIG. 8). After the moving motor 31 is stopped, the controller 81 drives the elevation motor 54 to lower the adsorption hand 16 to a predetermined position. Then, the controller 81 drives the open/close shutter actuator 67 to close the open/close shutter 66. As a result, the adsorption hand 16 is deprived of the adsorption force. Therefore, the part P is dropped on the second-stage table 13. In the case where another part P is already on the second-stage table 13, the part P is dropped on the another part P. Thus, the transfer operation is finished. The pickup arm 14 that executed the transfer is driven and controlled by the controller 81 for the next transfer operation.

In the case where all the pickup arms 14, in this embodiment, all the four pickup arms 14, are not used to transfer one part P, the other pickup arms 14 are driven and controlled by the controller 81 as described above to transfer another part P.

During the transfer operation by the pickup arm(s) 14, the extension motor 41 may be driven to change the orientation of the part P that is being held, such that printing is performed on the part P in a proper manner or such that the part P is placed on the second-stage table 13 in a proper manner.

Now, an example of the manner of adsorption by the adsorption hand 16 will be described.

Figure 10:
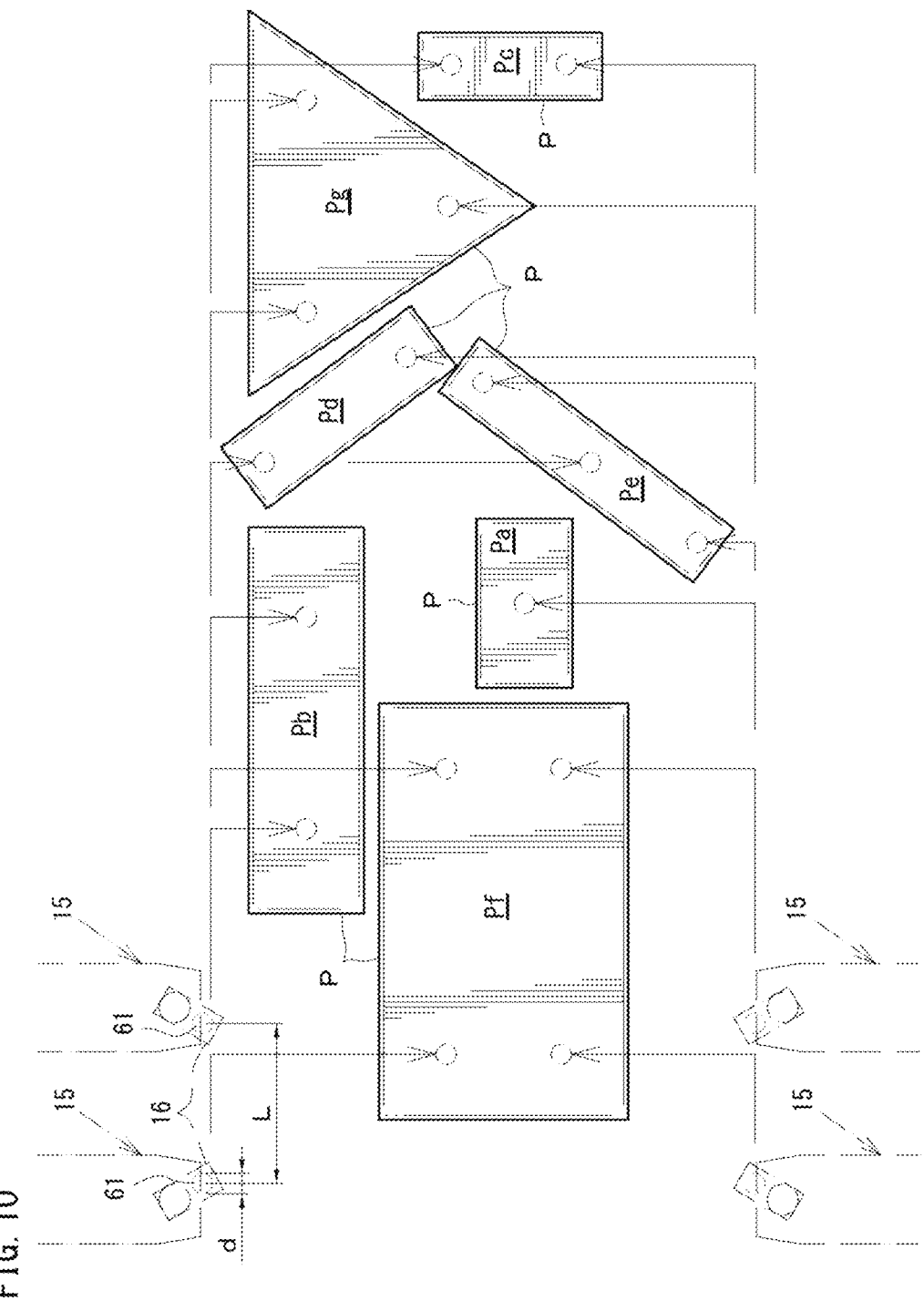
FIG. 10 shows adsorption positions of various types of parts.

Referring to FIG. 10, the controller 81 stores, on the RAM, information on the shortest distance L between the adsorption hands 16 of the pickup arms 14 located side by side in the X-axis direction and information on diameter d of the adsorption opening 61. The controller 81 compares these pieces of information against the graphics data on the part P to be picked up.

Based on the maximum length in the X-axis direction of the part P, the maximum length in the Y-axis direction of the part P, and the shape of the contour of the part P that are determined from the graphics data 83, and also based on the information on, for example, the diameter d of the adsorption opening 61, the controller 81 determines whether one adsorption hand 16 is sufficient to adsorb and hold the part P.

Referring to FIG. 10, in the case of a part Pa having a small length/width ratio, one coordinate position at a center thereof is set as an adsorption position. In FIG. 10, circles drawn with phantom lines represent adsorption positions. Parts Pb, Pc, Pd and Pe are longer than the shortest distance L between the adsorption hands 16, and therefore each have a length greater than a predetermined value that may be adsorbed and held by one adsorption hand 16. For each of the parts Pb, Pc, Pd and Pe, two or more coordinate positions including positions near two ends in a longitudinal direction thereof are set as adsorption positions. The parts Pb and Pc, which are long in the X-axis direction or in the Y-axis direction, and also the parts Pd and Pe, which are long in an oblique direction with respect to the X-axis direction and the Y-axis direction, are held accurately by the determination of the adsorption positions.

Parts Pf and Pg do not have a large length/width ratio. In the case of the part Pf, each of four sides has a length greater than the predetermined value that may be adsorbed and held by one adsorption hand 16. In the case of the part Pg, the distance from a position on each of three sides to an apex facing such a position has a length greater than the predetermined value that may be adsorbed and held by one adsorption hand 16. For the part Pf, four coordinate positions that are away in four directions from the central position and are also away from the contour line by a certain distance are set as adsorption positions. For the part Pg, three coordinate positions that are away in three directions from the central position and are also away from the contour line by a certain distance are set as adsorption positions. The rectangular part Pf or a part P having a polygonal shape close to a rectangular shape may be basically held by being adsorbed at four positions. The triangular part Pg, or a part P having at least one end thereof is farther from the center of gravity than the other end(s), may be held by being adsorbed at three or four positions.

Still referring to FIG. 10, in order to select the pickup arm 14 to be used to adsorb and hold the part P, the controller 81 refers to the position information on the part P to be picked up and information on a preferred order of transfer. More specifically, in the case of the part Pa having one adsorption position, the pickup arm 14 close to the part P in the Y-axis direction is activated with priority. In the case of the part Pe having three adsorption positions, the pickup arm 14 on the side opposite to the part Pe is also used although the pickup arm 14 at such a position is far from the part Pe. In the case where while the part Pb is transferred, the part Pa is also to be transferred at the same time for a reason regarding the transfer efficiency or the order of transfer, the pickup arms 14 located on the sides opposite to the parts Pb and Pa are used.

As described above, among the plurality of post-cutting parts P placed on one same plane, necessary parts P are accurately picked up in a proper order based on the graphics data 83 input from the cutting device. An appropriate site of the each of the parts P is adsorbed and held by the pickup arm 14, and the parts P are transferred to the next step. At this point, relative positions, as seen in a plan view, of one or more adsorption hands 16 are changed in accordance with the size or the shape of the part P, so that the part P is adsorbed by the required adsorption hand(s) 16. Therefore, the parts P of various shapes are picked up without fail.

In addition, all the adsorption hands 16 are not used to transfer the part P. Therefore, the pickup arms 14 (adsorption hands 16) that are not used to transfer the part P is usable to transfer another part(s) P at the same time. Thus, the transfer efficiency is improved.

As can be seen, use of the transfer apparatus 11 significantly decreases pickup errors as compared with manual transfer, and is flexibly responsive to various shapes of the parts and thus is highly efficient.

The pickup arm 14 is made movable between the cutting step and the next step by the moving body 17, which moves between the region of the cutting step and the region of the next step in a reciprocating manner. Therefore, each of the pickup arms 14 is operated in an orderly manner.

The moving body 17 is included in each of the pickup arms 14. Therefore, each of the pickup arms 14 is movable with a high level of freedom, and the parts P of various sizes and shapes are well handled.

Plural pickup arms 14, among the plurality of pickup arms 14, are provided on each of the two sides of the transfer line connecting the cutting step and the next step. Such an arrangement, in combination with the extendable arm portions 15, realizes a more efficient transfer operation with a compact structure.

As described above, the parts P are transferred as desired with no pickup error. In addition, the printing portion 71 provided between the cutting step and the next step prints an identification mark on each part P as necessary. Therefore, even if the parts P are scattered after being transferred, the work after the transfer operation is not disturbed.

With reference to FIG. 11 through FIG. 14, other embodiments will be described. For the following embodiments, elements identical to those in the embodiment described above will bear the same reference signs, and detailed descriptions thereof will be omitted.

Figure 11:
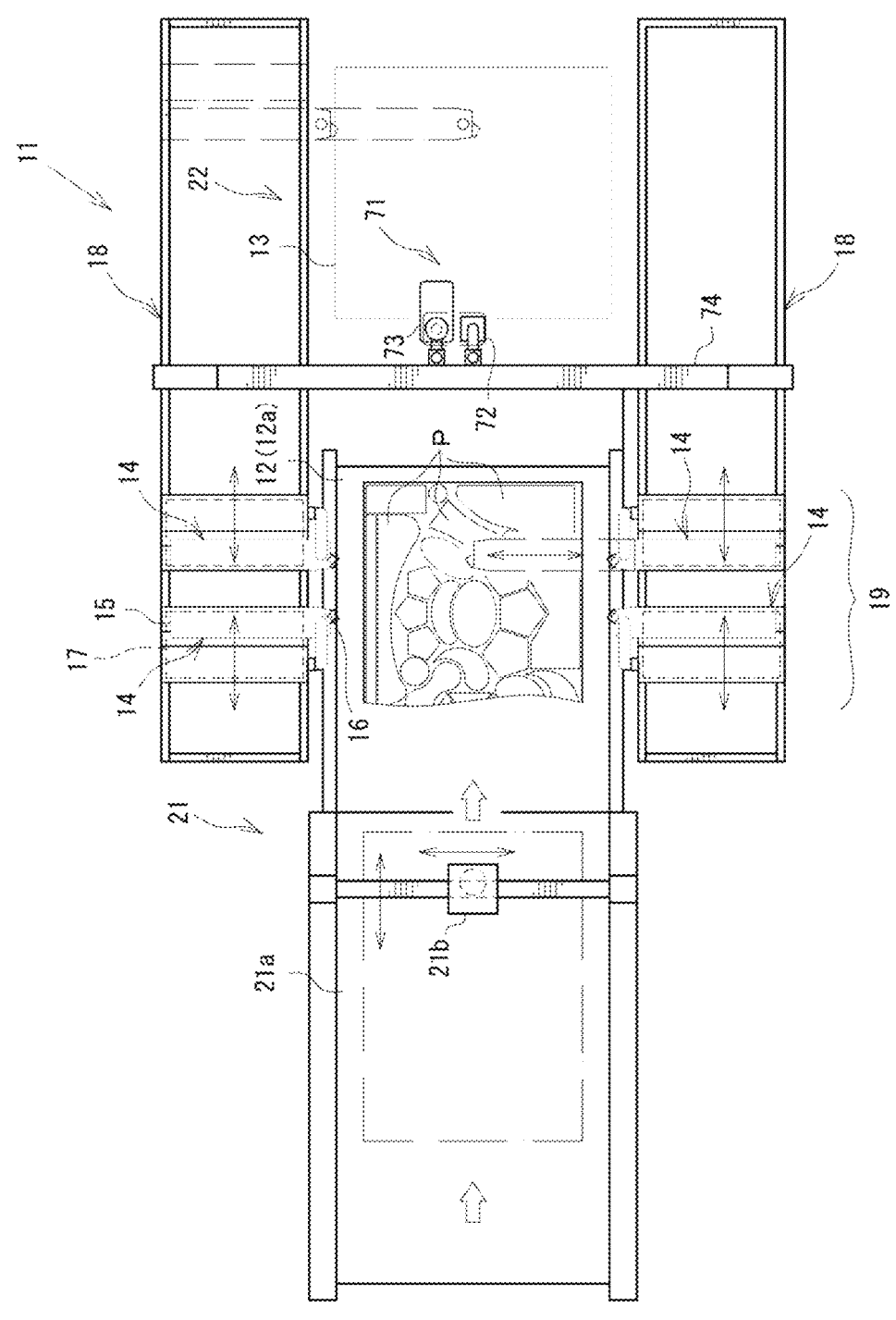
FIG. 11 is a plan view of a transfer apparatus according to another embodiment.

FIG. 11 is a plan view showing a schematic structure of the transfer apparatus 11. In this embodiment, the parts P cut by the cutting device are moved to, and wait on, the first-stage table 12 (pickup table 12) with the positional relationship thereof not being changed. In FIG. 11, reference sign 21*a* represents a cutting table, which is a conveyor. Reference sign 21*b* represents a cutting head movable on the cutting table 21*a* in the X-axis direction and the Y-axis direction. The pickup table 12*a* is a conveyor, like the cutting table 21*a*. The parts P cut by the cutting head 21*b* are transferred to a predetermined position on the first-stage table 12 with the positional relationship thereof not being changed.

The pickup arms 14 of the transfer apparatus 11 are movable between the first stage and the second stage (next step), namely, in this embodiment, between the first-stage table 12 (pickup table 12*a*) in the cutting step portion 21 and the gathering step portion 22.

Figure 12:
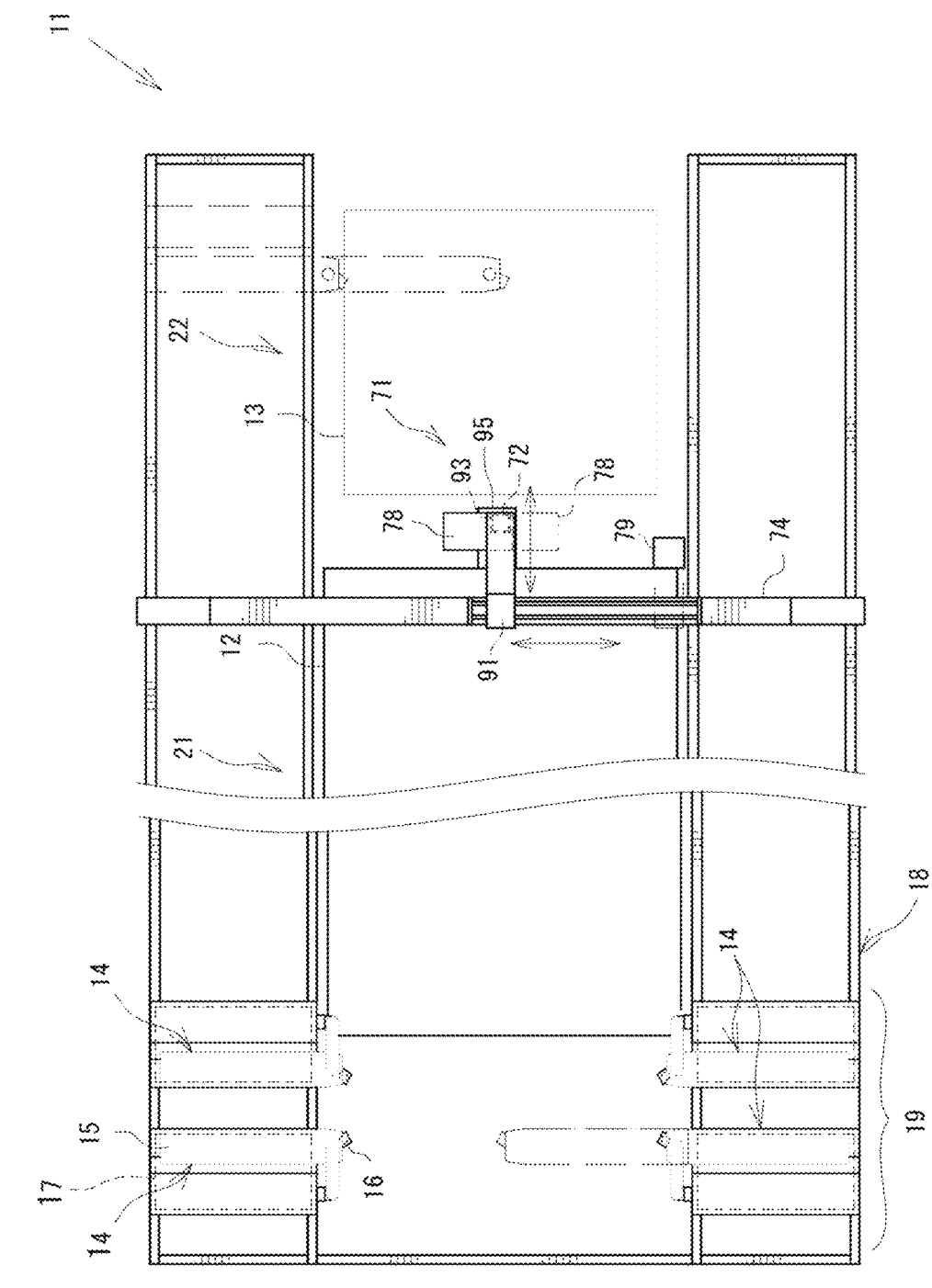
FIG. 12 is a plan view of a printing portion according to still another embodiment.
Figure 13:
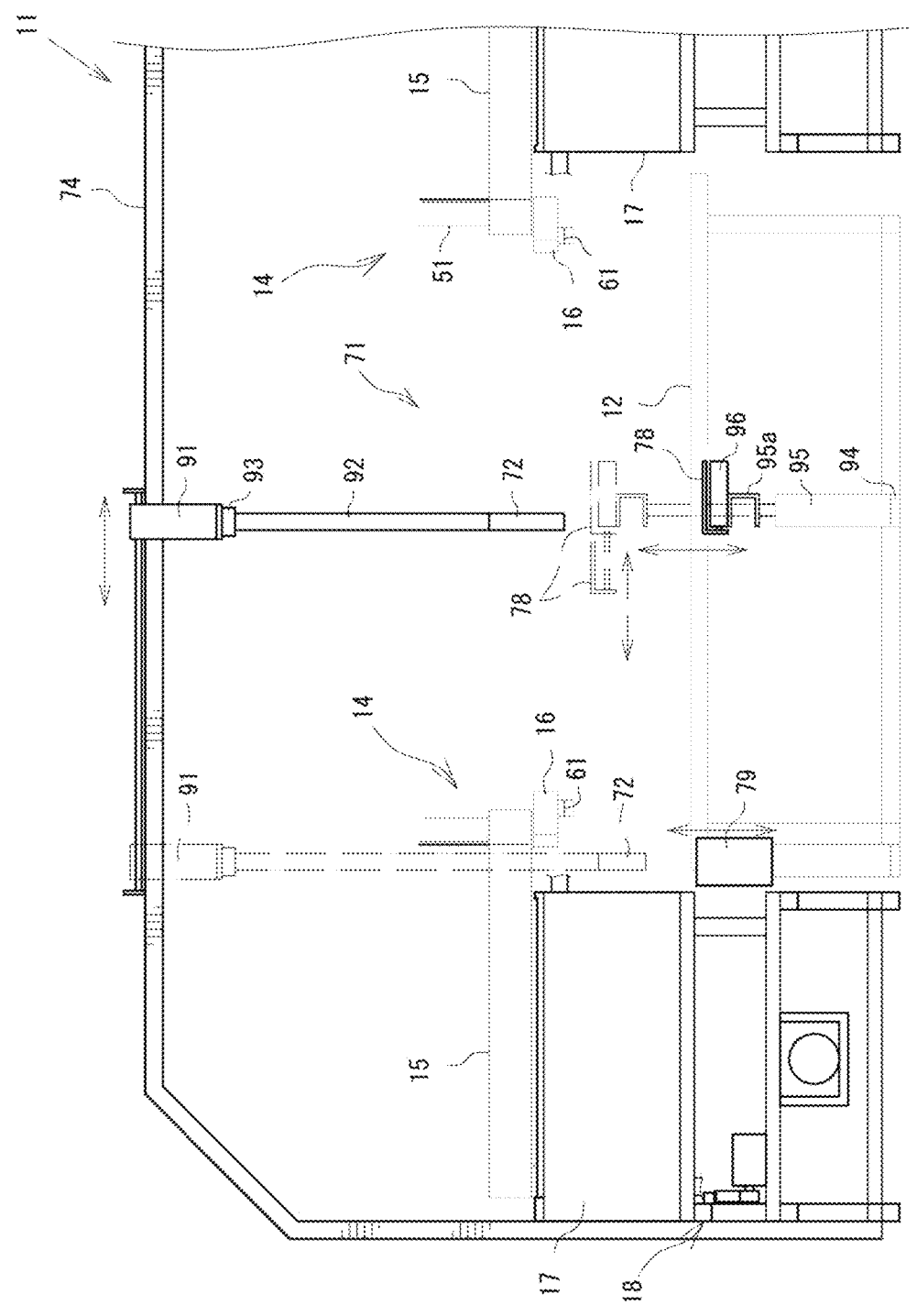
FIG. 13 is a view of the printing portion shown in FIG. 12 as seen in the X-axis direction.

FIG. 12 and FIG. 13 show the printing portion 71 according to still another embodiment. In the above-described embodiment, the printing portion 71 performs printing on a part P held by the pickup arm 14. By contrast, in this embodiment, the printing portion 71 performs the printing in a state where the part P is placed on a temporary table 78.

Specifically, the printing portion 71 is provided between the cutting step portion 21 and the gathering step portion 22, and includes the printer 72 hung from above such that the printing is performed by a bottom portion thereof. The printer 72 extends from a movable support 91, which protrudes, above a space between the cutting step portion 21 and the gathering step portion 22, in the direction in which the rails 18 extend, namely, in the X-axis direction (FIG. 12). The movable support 91 is movable along the support frame 74 in the Y-axis direction perpendicular to the direction in which the rails 18 extend, and is movable by an air cylinder in a reciprocating manner from a central position to an end in the Y-axis direction of the cutting step portion 21. A rod-like support shaft 92 is provided on a bottom surface of the movable support 91, and the printer 72 is held at a bottom end of the support shaft 92. A top end of the support shaft 92, a slidable body 93 is provided. The slidable body 93 is an air cylinder. The slidable body 93 is movable in a reciprocating manner in the X-axis direction and is stoppable at a predetermined position.

A bottom end of the printer 72 is located at a position that is above a surface of the first-step table 12 included in the cutting step portion 21 and is close to a height of the adsorption opening 61 at the bottom surface of the adsorption hand 16 of the pickup arm 14 at an initial position.

The temporary table 78 is located below the printer 72 of the printing portion 71, and is provided to place the part P thereon at a printing position where the printing is performed by the printer 72. The temporary table 78 is movable between the printing position and a retracted position, which is retracted from a horizontal region connecting the cutting step portion 21 and the gathering step portion 22.

In the example shown in FIG. 12 and FIG. 13, the retracted position is set at a position that is below the horizontal region, namely, the surface of the first-stage table 12, and is just below the printer 72.

The temporary table 78 is supported by an elevation mechanism 95 so as to be elevatable. The elevation mechanism 95 is provided on a support table 94. The support table 94 is provided below the first-stage table 12 and protrudes toward the gathering step portion 22. The temporary table 78 is movable in a reciprocating manner between a position below the surface of the first-stage table 12 and a position that is above this position and is of the same height as that of the printing position facing the printer 72. The elevation mechanism 95 is an air cylinder. The temporary table 78, which has an L-shaped cross-section, is provided on a horizontal moving mechanism 96, which is an air cylinder provided on a movable body 95a at a tip of the elevation mechanism 95.

The horizontal moving mechanism 96 provided between the elevation mechanism 95 and the temporary table 78 moves the temporary table 78 in a horizontal direction, more specifically, in the horizontal direction in the Y-axis direction. Therefore, the temporary table 78 is movable in a reciprocating manner by a predetermined distance in a direction perpendicular to the direction in which the pickup arm 14 is movable by the moving motor 31.

Reference sign 79 represents a member provided at a corner of the first-stage table 12. The first-stage table 12 has two edges extending in the Y-axis direction. One of the two edges that is closer to the gathering step portion 22 has two ends. The corner is one of the two ends. This member 79 is a holder that prevents ink in the printer 72 from being dried. The holder 79 is elevatable. The printer 72 is held by the holder 79 when necessary, for example, while printing is not performed.

In the transfer apparatus 11 including the printing portion 71 having such a structure, the controller 81 stops the moving motor 31 while the pickup arm 14 adsorbing the part P by the adsorbing hand 16 is moving in the X-axis direction toward the second-stage table 13. The controller 81 extends the pickup arm 14 to move the adsorption hand 16 in the Y-axis direction toward the printer 72. In synchronization with this movement, the controller 81 drives the elevation mechanism 95 to elevate the temporary table 78 upward. Prior to the elevation, the controller 81 drives the horizontal moving mechanism 96 to move the temporary table 78 away from the printer 72 in the Y-axis direction, such that the part P is placed on the temporary table 78, namely, such that the printer 72 does not interfere with the temporary table 78 when the part P is placed on the temporary table 78.

After moving the adsorption hand 16 adsorbing the part P to a predetermined position close to the printing position, the controller 81 stops the adsorption by the adsorption hand 16 to release the part P on the temporary table 78 raised to the height of the printing position. Thus, the part P is placed on the temporary table 78. The controller 81 drives the horizontal moving mechanism 96 to move the temporary table 78 in the Y-axis direction to move the part P toward the printer 72, such that a predetermined site of the part P is located below the printer 72. Next, the controller 81 drives the slidable body 93 to move the printer 72 in the X-axis direction toward the cutting step portion 21 while driving the printer 72 to perform printing. Then, the controller 81 drives the horizontal moving mechanism 96 to move the temporary table 78 away from the printer 72 to the initial position thereof, causes the adsorption hand 16 to adsorb the part P, and lowers the temporary table 78. The controller 81 drives the moving motor 31 again to move the pickup arm 14 in the X-axis direction toward the second-stage table 13.

With such a structure in which the part P is placed on the temporary table 78 to perform printing, the printer 72 and the adsorption hand 16 are prevented from interfering with each other. Thus, desired printing is performed properly. In addition, the printing is performed even without the part P being adsorbed by the adsorption hand 16. Therefore, there is an advantage that accurate printing is performed even on an especially small part P without fail. The temporary table 78 is elevatable and also is movable horizontally in the Y-axis direction by the horizontal moving mechanism 96. Therefore, the elements moving around the printer 72 are prevented from interfering with the printer 72, and desired printing is performed without fail.

Figure 14:
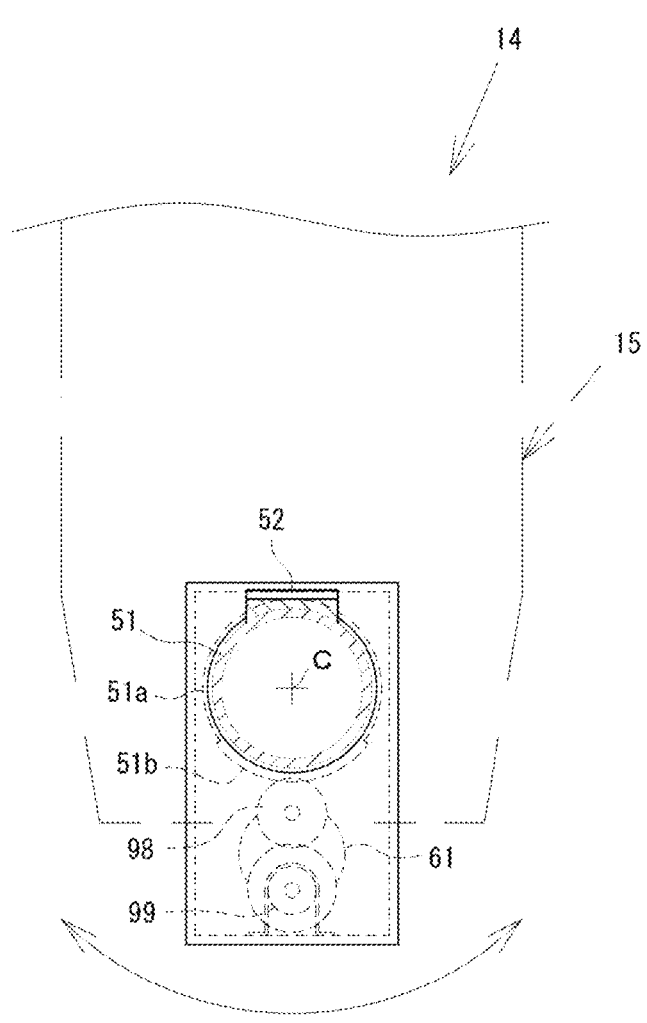
FIG. 14 is a cross-sectional view of a tip of an arm portion according to still another embodiment.

FIG. 14 shows the arm portion 15 of the pickup arm 14 in still another embodiment. The adsorption hand 16 at the tip of the arm portion 15 is rotatable about a central point C of the elevation pipe 51. FIG. 14 shows a state where the elevation pipe 51 is cut at a position above the adsorption hand 16. As shown in FIG. 14, a bottom end of the elevation pipe 51 and the adsorption hand 16 are coupled with each other so as to be rotatable with respect to each other. A brim 51a is formed at the bottom end of the elevation pipe 51, and a gear 51b is formed at a portion of the brim 51a that is opposite to the rack 52. A motor 99 transmitting a rotation force to the gear 51b via a gear 98 is provided inside the adsorption hand 16.

In the transfer apparatus 11 including the adsorption hand 16 having such a structure, the adsorption opening 61 at the tip of the adsorption hand 16 is swung in accordance with the driving of the motor 99. Therefore, the manner in which the part P is adsorbed has a higher level of freedom.

The above-described structure is merely one example to carry out the present invention. The present invention is not limited to the above-described structure, and may adopt any other appropriate structure.

For example, the arm portion 15 may be a robot arm having a plurality of axes.

The part P is not limited to being formed of cloth, and may be formed of a synthetic resin, wood, a metal material or the like.

The retracted position of the temporary table 78 may be on one side of the transfer line in the Y-axis direction. In the above description, the temporary table 78 is provided in a space between the first-stage table 12 and the second-stage table 13. Alternatively, the temporary table 78 may be provided on the second-stage table 13 side. In this case, a portion of, for example, the second-stage table 13 may be cut off, such that the temporary table 78 is located in the cut-off portion.

The part P may be still adsorbed by the adsorption hand 16 while being placed on the temporary table 78 for printing.

REFERENCE SIGNS LIST

11 . . . transfer apparatus
12 . . . first-stage table
13 . . . second-stage table
14 . . . pickup arm
15 . . . arm portion
16 . . . adsorption hand
17 . . . movable body
21 . . . cutting step portion
22 . . . gathering step portion
71 . . . printing portion
78 . . . temporary table
95 . . . elevation mechanism
96 . . . horizontal moving mechanism
P . . . part
What is claimed is:

1. A transfer apparatus picking up and transferring a plurality of parts, placed on one same plane as a result of a sheet being cut in a cutting step, to a next step, the transfer apparatus comprising:

a plurality of pickup arms each including an extendable arm portion and an adsorption hand adsorbing each of the plurality of the parts at a tip of the extendable arm portion, the plurality of the pickup arms being movable between the cutting step and the next step;

a controller driving and controlling the plurality of the pickup arms, the controller causing relative positions, as defined by two-dimensional coordinate data, as seen in a plan view, of the adsorption hands to be changed based on graphics data used in the cutting step, and causing each of the plurality of the parts to be adsorbed and picked up by at least one of the adsorption hands; and

a printer as hardware performing printing on each of the plurality of the parts, the printer being provided between the cutting step and the next step, the printer is hung from above such that the printing is performed by a bottom portion thereof, the transfer apparatus further comprises a temporary table allowing each of the plurality of the parts to be placed thereon, the temporary table being provided at a printing position, below the printer, at which the printer performs the printing, and the temporary table is movable between the printing position and a retracted position retracted from a horizontal region connecting the cutting step and the next step.

2. The transfer apparatus according to claim 1, wherein:

the plurality of the pickup arms are each supported by a movable body movable between a region of the cutting step and a region of the next step in a reciprocating manner, and plural pickup arms among the plurality of the pickup arms are located on each of two sides of a transfer line connecting the cutting step and the next step.

3. The transfer apparatus according to claim 1, wherein:

the retracted position is below the horizontal region, and the temporary table is supported by an elevation mechanism.

4. The transfer apparatus according to claim 3, further comprising a horizontal moving mechanism moving the temporary table in a horizontal direction, the horizontal moving mechanism being provided between the elevation mechanism and the temporary table, and the controller drives and controls the temporary table, the controller being adapted to move the adsorption hand adsorbing each of the plurality of the parts to a predetermined position in the vicinity of the printing position, to drive the elevation mechanism to elevate the temporary table to the same height as that of the printing position and stop the adsorption by the adsorption hand, then to drive the horizontal moving mechanism to move the part placed on the temporary table to a position below the printer and then drive the printer to perform the printing on the part, then to drive the horizontal moving mechanism to move the temporary table away from the position below the printer to cause the adsorption hand to adsorb one of the plurality of the parts, and to lower the temporary table and re-start transferring the one of the plurality of the parts by the adsorption hand.

* * * * *